United States Patent [19]
Wakamatsu et al.

[11] 3,724,293
[45] Apr. 3, 1973

[54] AUTOMATIC TRANSMISSION CONTROL SYSTEM FOR AUTOMOBILES

[75] Inventors: Hisato Wakamatsu, Kariya; Akira Kitano, Nagoya; Hisasi Kawai, Toyohashi, all of Japan

[73] Assignee: Nippondenso Kabushiki Kaisha, Kariya-shi, Aichi-ken, Japan

[22] Filed: May 4, 1970

[21] Appl. No.: 34,098

Related U.S. Application Data

[63] Continuation-in-part of Ser. No. 19,780, March 16, 1970, Pat. No. 3,652,901.

[30] Foreign Application Priority Data

May 7, 1969 Japan .............................. 44/34972
May 7, 1969 Japan .............................. 44/34973

[52] U.S. Cl. .......................... 74/866, 74/752 D
[51] Int. Cl. ................... B60k 21/00, F16h 3/74
[58] Field of Search ................. 180/105 E; 74/866

[56] References Cited

UNITED STATES PATENTS

| | | | |
|---|---|---|---|
| 3,052,134 | 9/1962 | Worster | 74/866 |
| 3,582,679 | 6/1971 | Carp | 180/150 E X |
| 3,267,762 | 8/1966 | Reval | 74/866 X |
| 3,354,744 | 11/1967 | Kuhrle et al. | 74/866 X |
| 3,433,101 | 3/1969 | Scholl et al. | 74/866 |
| 3,439,564 | 4/1969 | Scholl et al. | 74/866 |
| 3,448,640 | 6/1969 | Nelson | 74/866 |
| 3,575,256 | 4/1971 | Jania | 180/150 E |

*Primary Examiner*—Arthur T. McKeon
*Attorney*—Cushman, Darby & Cushman

[57] ABSTRACT

An automatic transmission control system for automobiles comprising a plurality of speed change signal generator circuits, which are connected to a logic circuit, which is in turn connected to a memory connected to an electromagnetic valve drive circuit including an AND circuit and a power supply circuit feeding solenoids of electromagnetic valves.

22 Claims, 14 Drawing Figures

AUTOMATIC TRANSMISSION CONTROL SYSTEM FOR AUTOMOBILES

This application is a continuation-in-part of our commonly assigned copending application Ser. No. 19,780, filed Mar. 16, 1970, now U.S. Pat. No. 3,652,901.

This invention relates to improvements in automatic transmission control systems on automobiles for automatically shifting transmission gears in accordance with the conditions of speed and load of travelling automobiles.

Figure 1:
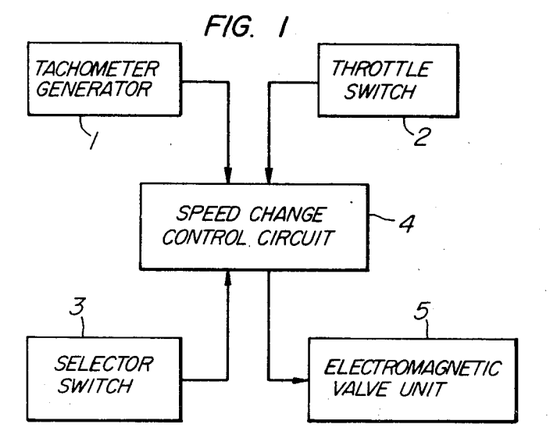
FIG. 1 is a block diagram outlining the conventional automatic transmission control system for automobiles.

By way of example of prior art automatic transmissions on automobiles, a four-forward-speed automatic transmission control system for buses is now explained herein. Referring to FIG. 1 of the accompanying drawings, which shows the exemplary prior art automatic transmission control system, a tachometer generator detecting the r.p.m. of the vehicle wheels supplies output voltage proportional to the vehicle speed as the vehicle speed signal to a gear-shift signal control circuit 4. A throttle switch 2 connected to the speed change signal control circuit 4 acts to switch the reference voltage of the gear-shift signal control circuit 4 in response to the vehicle load to change the shifting point of time, either for speed-up or speed-down. It is responsive to positions of the accelerator pedal; it is successively switched into "Light", "Normal" and "Full" states as the accelerator pedal continues to be further depressed. A selector switch 3 connected to the speed change signal control circuit 4 is equivalent to the change lever of the car. It has microswitches associated respectively to a reverse gear, a first forward-speed gear (hereinafter termed the first), a second forward-speed gear (hereinafter termed the second), a third forward-speed gear (hereinafter termed the third) and a fourth forward-speed gear (hereinafter termed the fourth) and a manual-automatic switch to actuate these microswitches so as to energize electromagnetic solenoids of solenoid valves in the electromagnetic valve unit 5. The speed change signal control circuit 4 receives output signals from the tachometer generator 1, throttle switch 2 and selector switch 3 to determine the gear ratio to be made at the time of shifting gears in accordance with the car load for the actuation of the electromagnetic valve unit 5. The electromagnetic valve unit 5 comprises a set of five electromagnetic valves, one for the reverse gear and the remaining four for the respective four forward-speed gears, and solenoid coils individually associated to the respective electromagnetic valves. Energization of one of the solenoids has the effect of opening a corresponding electromagnetic valve to admit air under pressure so as to link an associated clutch, thereby bringing a specified gear into mesh with the entire side gear through fluid coupling.

Figure 2:
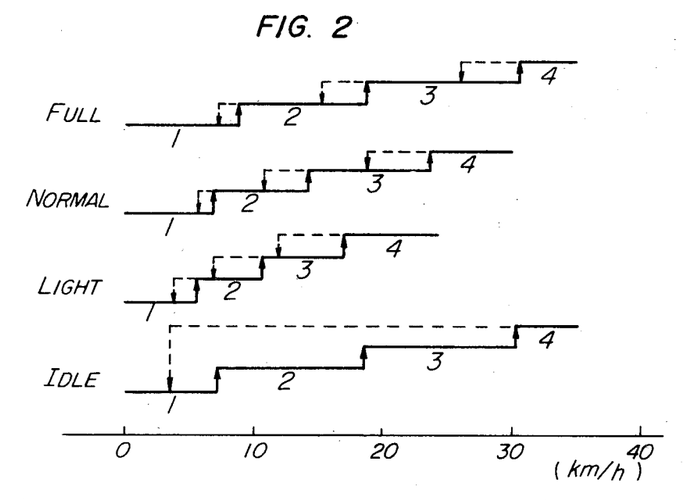
FIG. 2 is a graph showing the shifting characteristics of the conventional automatic transmission control system.

The shifting characteristics of the preceding prior art system are shown in FIG. 2 of the accompanying drawings, in which the abscissa represents the vehicle speed in kilometers per hour and the ordinate represents the position or state of the throttle switch 2. In the figure, reference numerals 1, 2, 3 and 4 respectively correspond to the first, second, third and fourth gear in mesh, arrows indicate the respective shifting points, solid line segments indicate increasing vehicle speed, and dashed line segments indicate decreasing vehicle speed. It will be apparent from the FIG. that though there is no inconvenience so far as the normal driving is concerned, there are disadvantages encountered when it is desired to bring about the engine braking by maintaining the position of the transmission attained during acceleration on a horizontal road or drive under the engine braking down decline without shifting gear. When pressure on the accelerator pedal is released, the vehicle speed necessarily increases, so that the throttle switch 2 inevitably goes from the "Full" state down to the "Normal", "Light" and "Idle" states successively. As a result, the transmission is upshifted into the next gear, thus disabling the deceleration by the engine brake while transmission is maintained in the previous gear position. A similar disadvantage is also encountered when rapid deceleration becomes urgent when going up an incline, particularly at a high vehicle speed. Releasing pressure on the accelerator pedal leads to upshifting into the next gear prior to deceleration, which gear, however, is replaced by the previous lower-speed gear upon depressing the accelerator pedal again in order to increase the vehicle speed immediately after deceleration. These disadvantages have heretofore been overcome by manually operating the selector switch 3 to shift into the desired gear every time such gear shift becomes necessary, which disadvantageously reduces the merit of the automatic transmission control.

An object of the invention is to obviate the above drawbacks by the provision of a novel automatic transmission control system, which enables effecting the engine brake after acceleration on a horizontal road or after slight acceleration on a decline without manually operating the selector switch to change the gear to a desired position at the termination of the acceleration. This is accomplished by so arranging as to subject the "Full" and "Normal" states of the throttle switch respectively to a predetermined delay, so that the signal representing the "Full" or "Normal" state is available for a predetermined period of time from the instant that the throttle switch is switched into the "Full" or "Normal" state regardless of the vehicle speed, and by introducing a memory in front of an electromagnetic valve drive circuit in a speed change signal control circuit, so that although the throttle switch is rendered into the "Idle" state by releasing the accelerator pedal, the input to the memory is cut when the throttle switch is in the "Idle" state and the position of the gears immediately before releasing the accelerator pedal is maintained through the memory action and is prevented from being shifted.

According to the invention, a plurality of speed change signal generator circuits are connected to a logic circuit in connection to a memory connected to an electromagnetic valve drive circuit including an AND circuit and a power supply circuit feeding solenoids of electromagnetic valves, so that the signal corresponding to the position of the gears memorized by the memory is fed to the electromagnetic valve drive circuit to prevent downshifting, thus enabling execution of the engine brake by releasing the accelerator pedal and by maintaining the position of the gears, in which the accelerator pedal has been depressed, by virtue of the memory action to achieve an excellent effect.

Also, according to the invention the automatic transmission control system includes a multi-state throttle switch co-operating with the accelerator pedal and connected to a throttle circuit, which includes a circuit generating output signals corresponding to the states of the throttle switch and timer circuits individually associated to respective contacts of the multi-state throttle switch and maintaining a signal corresponding to the previous state of the throttle switch at the respective output terminals for a predetermined period of time only when the extent of the depression on the accelerator pedal is reduced, the signal generated from the throttle switch upon releasing the accelerator pedal being adopted to cut an input signal to the memory, which thus maintains the speed change signal immediately before the cutting thereof. This leads to excellent effects that by releasing the accelerator pedal after a little acceleration on a decline or horizontal road and causing the engine brake there occurs no upshifting into the next gear but the gears at the time of releasing the accelerator are maintained in position, and that by no upshifting into the adjacent higher-speed gear takes place at the moment of releasing the accelerator for rapid deceleration and no downshifting into the next gear takes place by depressing the accelerator pedal afresh for acceleration immediately after deceleration even in a situation of driving up an incline at a relatively high speed with the accelerator pedal pushed down. This system is also by no means inferior to the conventional system in regard of normal driving.

The above and other objects, features and advantages will be more apparent from the following detailed description of the preferred embodiments of the automatic transmission control system according to the invention with reference to the accompanying drawings, in which.

The invention is now described in connection with the first embodiment of the automatic transmission control system thereof shown in FIG. 3a. It comprises a tachometer generator 10, a throttle switch 20, a selector switch 30, an electromagnetic valve unit 40 and a speed change signal control circuit generally designated at 100 and including an a.c.-to-d.c. converter 110, a throttle circuit 120, a first-to-second speed change signal generator 130 to generate a first-to-second speed change signal, a second-to-third speed change signal generator 140 to generate a second-to-third speed change signal, a third-to-fourth speed change signal generator 150 to generate a third-to-fourth speed change signal, a logical circuit 160, a memory 170, and an electromagnetic valve drive circuit 180. The tachometer generator 10 has an output terminal 11 connected to an input terminal 111 of the a.c.-to-d.c. converter 110. The throttle switch 20 has output terminals 21, 22 and 23, with the terminal 21 connected to an input terminal 179 of the memory 170 and the other terminals 22 and 23 connected to respective input terminals 121 and 122 of the throttle circuit 120. The a.c.-to-d.c. converter 110 has an output terminal 112 connected to input terminals 131, 141 and 151 of the respective first-to-second, second-to-third and third-to-fourth speed change signal generators 130, 140 and 150, each of which has another input terminal, namely terminals 132, 142 and 152, connected to an output terminal 124 of the throttle circuit 120. The first-to-second speed change signal generator 130 has output terminals 133 and 134 connected to respective input terminals 161 and 162 of the logical circuit 160, the second-to-third speed change signal generator 140 has output terminals 143 and 144 connected to respective input terminals 163 and 164 of the logical circuit 160, and the third-to-fourth speed change signal generator 150 has output terminals 153 and 154 connected to respective input terminals 165 and 166 of the logical circuit 160, which has output terminals 161', 162', 163' and 164' connected to respective input terminals 171, 172, 173 and 174 of the memory, which in turn has output terminals 175, 176, 177 and 178 connected to respective input terminals 181, 182, 183 and 184 of the electromagnetic valve drive circuit 180 having output terminals 185, 186, 187 and 188 connected to respective input terminals 41, 42, 43 and 44 of the electromagnetic valve unit 40. The selector switch 30 has output terminals 31, 32, 33, 34 and 35, with the terminal 31 connected to input terminal 189 of the electromagnetic valve drive circuit 180, the terminals 32, 33 and 34 connected to respective input terminals 41, 42 and 43 of the electromagnetic unit 40 and the terminal 35 connected to an input terminal 45 of the electromagnetic valve unit 40. The power supply and the power supply circuit are omitted for the sake of brevity.

The circuit construction and operation of various component parts of the above control system together with the over-all operation thereof will now be described.

The tachometer generator 10 (for example, the tachometer generator 11 as shown in Wakamatsu et al.

Figure 4:
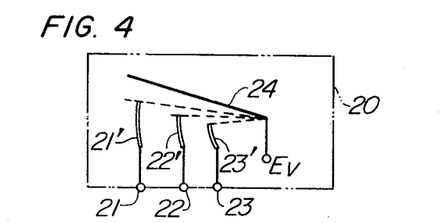
FIG. 4 is a circuit diagram of an example of a throttle switch in the system according to the invention.
Figure 11:
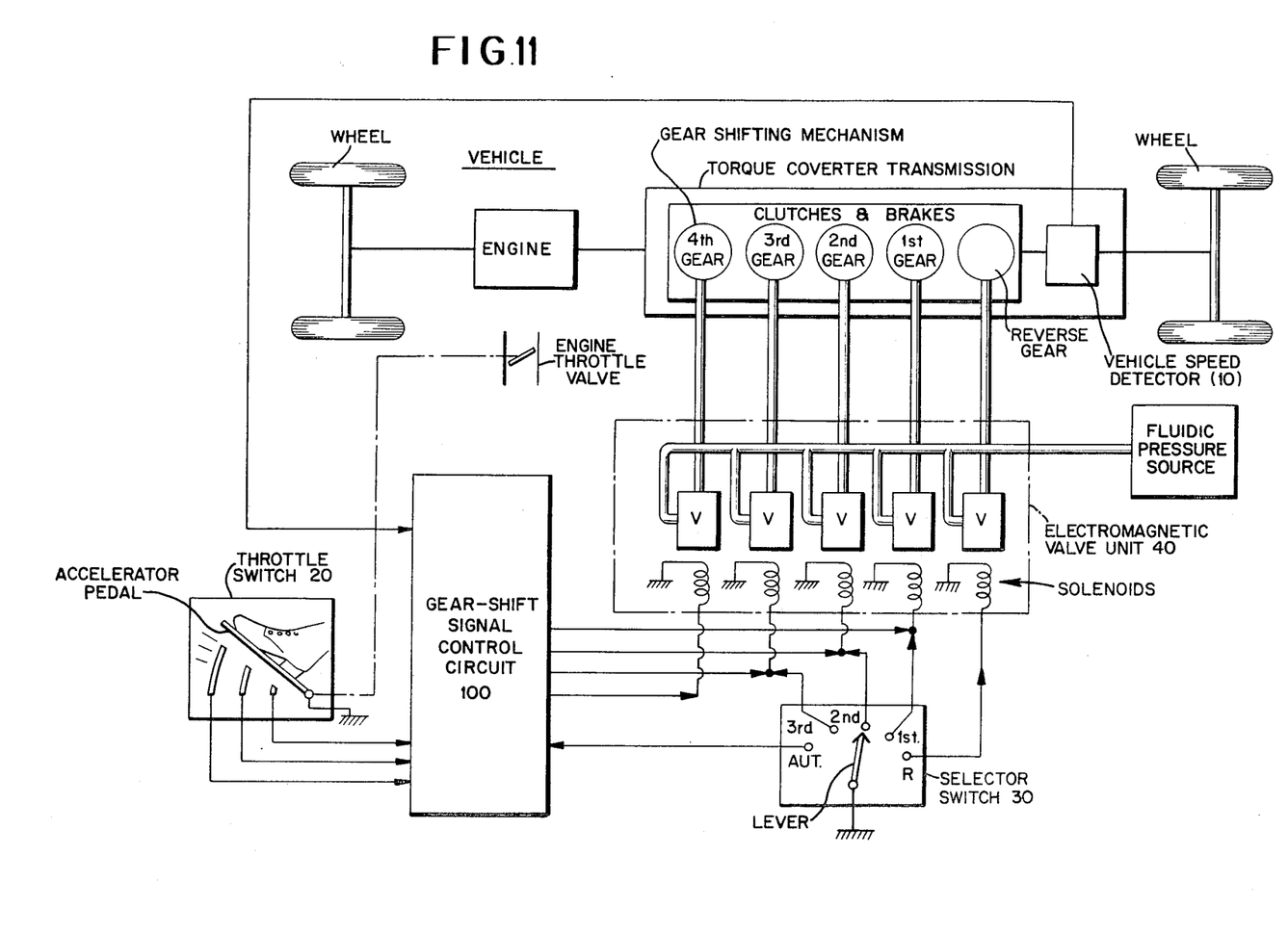
FIG. 11 is a diagrammatic general layout of the whole vehicular system.

U.S. Pat. No. 3,507,544) may be attached to a tachometer cable take-out provided in the automobile or built in the automobile transmission (see FIG. 11), and generates an output at frequencies proportional to the vehicle speed at the output terminal 11. The a.c.-to-d.c. converter 110 converts the frequency output of the tachometer generator 10 into d.c. voltage, which appears at the output terminal 112. The throttle switch 20 is of a multi-contact construction as shown in FIG. 4. It has a movable contact 24 or accelerator and fixed contacts 21', 22' and 23' adopted to be successively contacted by the movable contact 24 while the throttle opening (see FIG. 11) progressively increases to reach the "Light" state, whereupon the contact 21' is made, the "Normal" state, whereupon the contact 22' is made, and the "Full" state, whereupon the contact 23' is made, when the accelerator pedal is continuously depressed; in the "Full" state of the throttle the movable contact 24 is in contact with all the fixed contacts 21', 22' and 23'. To the movable contact 24 is applied a constant voltage $E_v$.

Figure 5A:
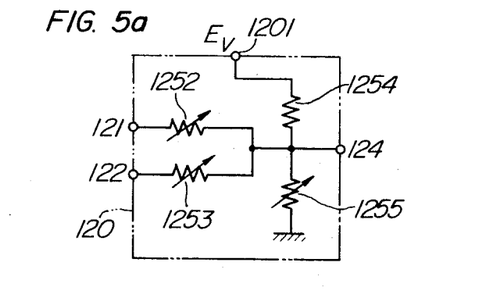
FIG. 5a a circuit diagram of a first example of a throttle circuit of the system according to the invention.

As shown in FIG. 5a, the throttle circuit 120 has a terminal 1201, on which is applied the voltage $E_v$, a variable resistor 1252 having one end connected to the input terminal 121 of the throttle circuit 120 and the other end in connection to the output terminal 124 of the throttle circuit 120, a variable resistor 1253 having one end in connection to the input terminal 122 of the throttle circuit 120 and the other end in connection to the output terminal 124, a resistor 1254 inserted between the terminal 1201 and the output terminal 124 and a variable resistor 1255 inserted between the output terminal 124 and the ground.

In the operation of the throttle circuit 120 of the above construction, when the signal (voltage $E_v$) is absent at the input terminals 121 and 122, the output terminal 124 is at a voltage $E_1$ given as:

$$E_1 = R_1/(R+R_1) \cdot E_v,$$

where $R$ is the resistance of the resistor 1254 and $R_1$ is the resistance of the variable resistor 1255. When the signal $E_v$ is applied on the input terminal 121 upon actuation of the throttle switch into the "Normal" state as the accelerator pedal is pushed down on, the output terminal 124 becomes to be at a voltage $E_2$ given as:

$$E_2 = R_1/(R_1 + R \parallel R_2) \cdot E_v,$$

where $R_2$ is the resistance of the variable resistor 1252. When the accelerator pedal is fully depressed the throttle switch 20 goes to the "Full" state, causing the signal $E_v$ to appear at both the input terminals 12 and 122. As a result, the output terminal 124 comes up with a voltage $E_3$ given as:

$$E_3 = R_1/(R \parallel R_2 \parallel R_3 + R_1) \cdot E_v,$$

Where $R_3$ is the resistance of the variable resistor 1253. To summarize, the "Light", "Normal" and "Full" states of the throttle switch 20 correspond to the respective output voltages $E_1$, $E_2$ and $E_3$ at the output terminal 124.

Figure 6:
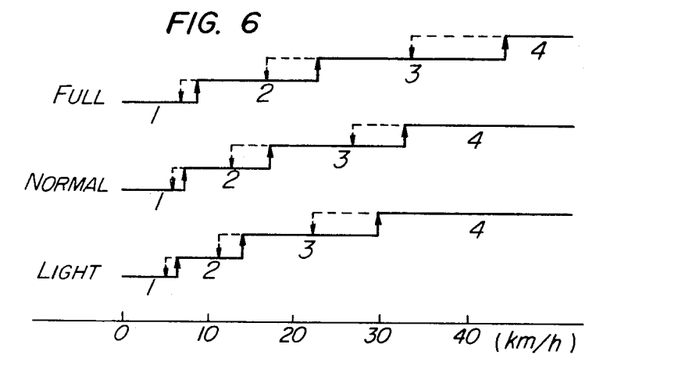
FIG. 6 is a graph showing the shifting characteristics of the system according to the invention.
Figure 6A:
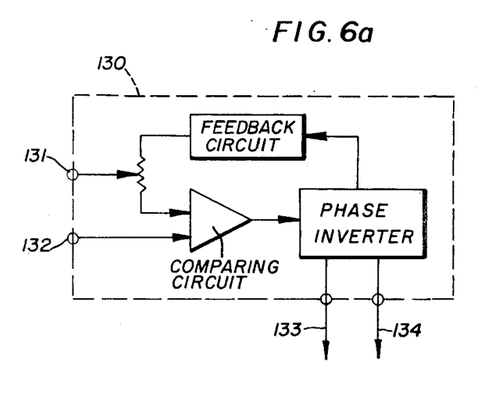
FIG. 6a is an exemplary showing of one of the gear change signal generators of FIGS. 3a and 3b.

The first-to-second, second-to-third and third-to-fourth speed change signal generators 130, 140 and 150 compare the signal (voltage) proportional to the vehicle speed fed from the output terminal 112 of the a.c.-to-d.c. converter 110 and the signal (voltage) from the throttle circuit 120 indicating the throttle state. Their parameters are preset to give shifting characteristics (excepting for the "Idle" state) as shown in FIG. 6. In the Figure, the abscissa represents the vehicle speed in kilometers per hour, and the ordinate stands for the "Light", "Normal" and "Full" states of the throttle switch 20, with the upward arrows corresponding to points of the gear shift from the first into the second, from the second into the third, and from the third into the fourth and the downward arrows corresponding to the gear shift from the fourth into the third, from the third into the second and from the second into the first. The first-to-second speed change signal generator 130 is responsible for the gear shift from the first into the second and vice versa, the second-to-third speed change signal generator 140 is responsible for the gear shift from the second into the third and vice versa, and the third-to-fourth speed change signal generator 150 is responsible for the gear shift from the third into the fourth and vice versa. They each comprise a comparing circuit, a feedback circuit and a phase inverter as shown in FIG. 6a.

At the first-to-second shifting point, the signal voltage of the first-to-second speed change signal generator 130 does not appear at the output terminal 133 thereof, but does appear at the terminal 134 thereof. (For the sake of simplification, the presence and absence of the signal voltage are hereinafter abbreviated respectively to "1" and "0".) At the time of shifting from the second into the first, the output terminal 133 is at "1" while the output terminal 134 is at "0". Similarly, at the second-to-third shifting point the second-to-third speed change signal generator 140 comes up with the output terminal 143 at "0" and the output terminal 144 at "1", and at the third-to-second shifting point the output terminal 143 is at "1" while the output terminal 144 is at "0". At this time the output terminals 133 and 134 of the first-to-second speed change signal generator 130 are respectively at "0" and "1". Also, at the third-to-fourth shifting point the output terminals 153 and 154 of the third-to-fourth speed change signal generator 150 are respectively at "0" and at "1", and conversely, upon the gear shift from the fourth into the third the output terminals 153 and 154 are respectively at "1" and at "0". At this time the output terminals 133 and 143 are at "0", and the output terminals 134 and 144 are at "1". The foregoing is shown by the chart in FIG. 7, where 1 ⇌ 2 indicates the shifting points from the first into the second and the reverse, 2 ⇌ 3 indicates the shifting points from the second into the third and the reverse, and 3 ⇌ 4 indicates the shifting points from the third into the fourth and the reverse. At these points the condition of the terminals 133, 134, 143, 144, 153 and 154 are switched from "1", representing the presence of the signal voltage, into "0", representing the absence of the signal voltage, or from "0" into "1".

Figure 3A:
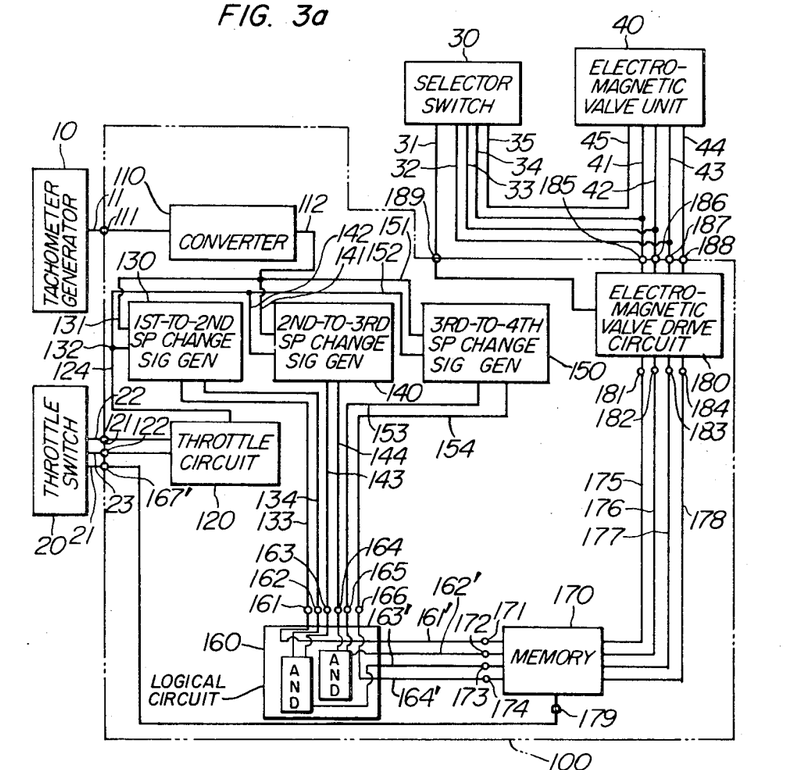
FIG. 3a is a block diagram showing circuit connections of a first embodiment of the automatic transmission control system according to the invention.
Figure 7:
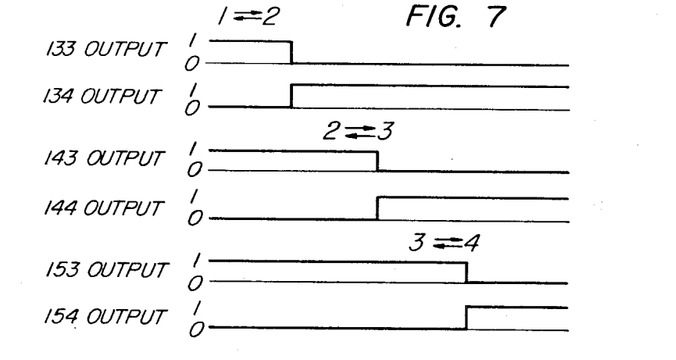
FIG. 7 is a chart of output characteristic to illustrate the operation of three gear-shift signal generator circuits of the system according to the invention.
Figure 8:
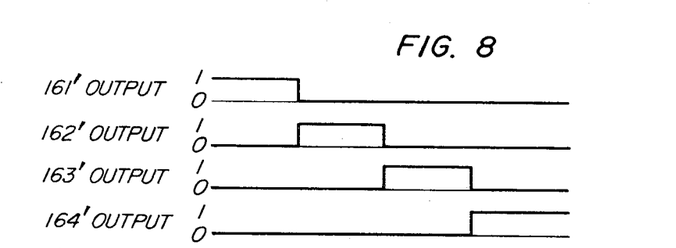
FIG. 8 is a chart of output characteristic to illustrate the operation of a logic circuit of the system according to the invention.

The logical circuit 160, may be similar to the logic circuitry shown in Computer Handbook by Huskey and Korn, First Edition, McGraw-Hill Book Company, receives the signals from the gear shift signal generators 130, 140 and 150, as shown in FIG. 7, as the input at its input terminals 161 to 166 to produce output signals at its four output terminals 161', 162', 163' and 164', as shown in FIG. 8 and as a result of the internal circuitry shown in FIG. 3a for logic circuit 160. As is seen, with the transmission in the first the output terminal 161' is at "1" while the other output terminals 162', 163' and 164' are at "0", with the transmission in the second the output terminal 162' is at "1" while the other output terminals 161', 162' and 163' are at "0", with the transmission in the third the output terminal 163' is at "1" while the other output terminals 161', 162' and 164' are at "0", and with the transmission in the fourth the output terminal 164' is at "0"'" while the other output terminals 161', 162' and 163' are at "0.

Figure 9:
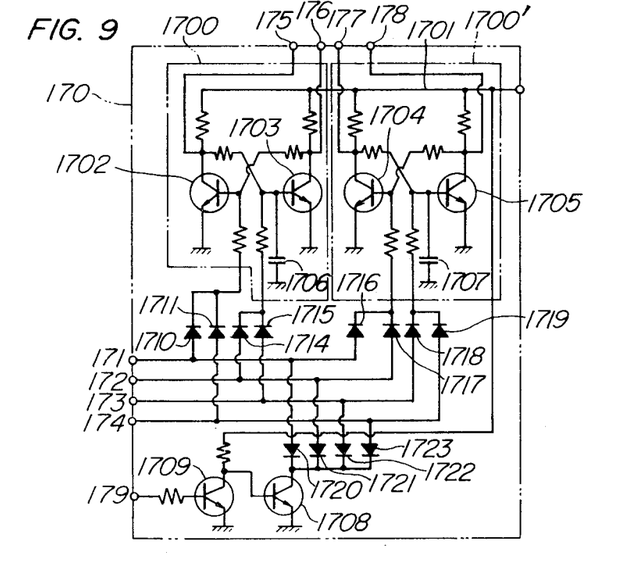
FIG. 9 is a circuit diagram of an example of a memory of the system according to the invention.

The memory 170 of the embodiment of FIG. 3a is of a circuit construction shown in detail in FIG. 9. It includes bistable multi-vibrators 1700 and 1700', which are well known in the art, and which have a common lead 1701 to a power supply. The bistable multi-vibrator 1700 has a pair of transistors 1702 and 1703, and the bistable multi-vibrator 1700' has a pair of transistors 1704 and 1705. These multi-vibrators have respective capacitors 1706 and 1707 connected to the base of the respective transistors 1703 and 1705, so that only the transistors 1702 and 1704 are triggered while the transistors 1703 and 1705 are maintained off upon appearance of a voltage across the supply lead 1701 for a certain delay time. The memory 170 also includes a transistor 1708, whose base is connected to the collector of a transistor 1709 and whose emitter is grounded. The collector of the transistor 1709 is in connection through a resistor to the supply lead 1701. The transistor 1709 has its base connected through a resistor to the input terminal 179 of the memory 170 and its emitter in connection to the ground. The memory 170 also includes diodes 1710, 1711, 1714, 1715, 1716, 1717, 1718, 1719, 1720, 1721, 1722 and 1723, with the diodes 1710 and 1711 having respective negative poles connected through a common resistor to the base of the transistor 1702 and the positive poles connected respectively to the memory input terminals 171 and 174, the diodes 1714 and 1715 having respective negative poles connected through a common resistor to the base of the transistor 1703 and positive poles respectively connected to the memory input terminals 172 and 173, the diodes 1716 and 1717 having negative poles connected through a common resistor to the base of the transistor 1704 and respective positive poles respectively connected to the memory input terminals 171 and 172, the diodes 1718 and 1719 having respective negative poles connected through a common resistor to the base of the transistor 1705 and respective positive poles respectively connected to the memory input terminals 173 and 174, and the diodes 1720 to 1723 having respective positive poles respectively connected to the memory input terminals 171 to 174 and respective negative poles commonly connected to the collector of the transistor 1708.

In operation, when a power supply switch not shown is turned on, voltage appears across the supply lead 1701 to trigger the transistors 1702 and 1704 a certain period before the triggering of the transistors 1703 and 1705, which are thus maintained off through the action of the capacitors 1706 and 1707. By the subsequent impression of signal (voltage) upon the input terminal 179 the transistor 1709 is triggered on, while the transistor 1708 remains off. Now in this situation, when the first-speed signal enters the memory 170, namely when only the input terminal 171 becomes at "1" while the other input terminals 172, 173 and 174 are at "0", voltage is impressed through the diode 1710 upon the base of the transistor 1702 to the result that the transistor 1702 continues to carry current while the transistor 1703 continues to be off, and at the same time a voltage is impressed through the diode 1716 upon the base of the transistor 1704 with the result that the transistor 1704 continues to carry a current while the transistor 1705 continues to be off, so that the signals at the output terminals 175 and 177 are "0" and the signals at the output terminals 176 and 178 are "1". Next, when the memory receives the second-speed signal, the signal "1" is applied to the input terminal 172, while the remaining input terminals receive the signal "0", hence a current is caused to pass through the diode 1714 and the base of the transistor 1703, thus triggering the transistor 1703 to cut off the transistor 1702, and at the same time a current is caused to flow through the diode 1717 and the base of the transistor 1704 with the result that the transistor 1704 continues to carry a current while the transistor 1705 remains off, so that the signals at the output terminals 175 and 178 are "1" and the signals at the output terminals 176 and 177 are "0". When the third-speed signal is applied, with the "1" signal applied to the input terminal 173 and the "0" signal applied to the remainder, a current is caused to pass through the diode 1715 and the base of the transistor 1703 to allow a current to flow through the transistor 1703 but no current through the transistor 1702, and at the same time a current is caused to flow through the diode 1718 and the base of the transistor 1705, thus triggering the transistor 1705 to conduct and thereby cutting off the transistor 1704, so that the signals at the output terminals 175 and 177 are "1" and the signals at the output terminals 176 and 178 are "0". Finally, when the fourth-speed signal is applied to impress the signal "1" to the input terminal 174 and the signal "0" to the remainder, a current is caused to flow through the diode 1711 and the base of the transistor 1702, thus triggering the transistor 1702 to conduct and thereby cutting off the transistor 1703, and at the same time a current is caused to flow through the diode 1719 and the base of the transistor 1705 with the result that the transistor 1705 continues to carry a current and the transistor 1704 remains off, so that the signals at the output terminals 175 and 178 are "0" and the signals at the output terminals 176 and 177 are "1". The foregoing is tabulated in the following.

Table Condition of the Input and Output Terminals

| Speed-Signal | Input Terminals 171, 172, 173 and 174 | Output terminals 175 176 177 178 |
|---|---|---|
| First | 171 at "1" and the remainder at "0" | "0" "1" "0" "1" |
| Second | 172 at "1" and the remainder at "0" | "1" "0" "0" "1" |
| Third | 173 at "1" and the remainder at "0" | "1" "0" "1" "0" |
| Fourth | 174 at "1" and the remainder at "0" | "0" "1" "1" "0" |

When driving the automobile with the transmission placed, for instance, in third, the input terminal 173 of the memory 170 is at "1" and the rest are at "0", so that the output terminals 175 and 177 are at "1" and the output terminals 176 and 178 are at "0". In this situation, by releasing the accelerator pedal the throttle switch 20 returns to the "Idle" state, whereupon the signal (voltage) at the output terminal 21 of the throttle switch 20 becomes "0", thereby impressing the signal of 0 (volts) upon the input terminal 179 of the memory 170 to cut off the transistor 1709 and thus trigger the transistor 1708 on with the result that the memory input terminals 171 to 174 are grounded through the respective diodes 1720 to 1723 and the triggered transistor 1708, so that the transistors 1702 and 1704 remain on and the transistors 1703 and 1705 remain off. Thus, the state of the transistors 1702 to 1705 is maintained even if the signals at the input terminals 171 to 174 undergo inversion. That is, the sudden spontaneous downshifting into first gear following the application of engine braking by release of the accelerator pedal will not result because of the persistence of the state of the transistors 171 to 174. Also, the above described operation applies to driving with the transmission placed in any position (first, second, third or fourth). In this case, after rendering the throttle switch into the "Idle" state by releasing the accelerator pedal, the resultant engine braking may be caused with the gear position at the time of releasing the accelerator pedal, and if the accelerator pedal is again depressed to impress a signal to the input terminal 179 of the memory 170, the transistor 1709 is triggered to conduct and to thereby cut off the transistor 178, thus releasing the state maintained until that time.

The electromagnetic valve drive circuit 180 drives electromagnetic valves of the electromagnetic valve unit 40. It has an input terminal 189 which is connected through the contacts of the selector switch 30 to the power supply, and this becomes operative when it receives signal (voltage) from the output terminal 31 of the selector switch 30. It also receives signals to be impressed on the input terminals 181 and 184 to produce corresponding signals at the output terminals 185 to 188 for actuation of the electromagnetic valve unit 40.

Figure 10:
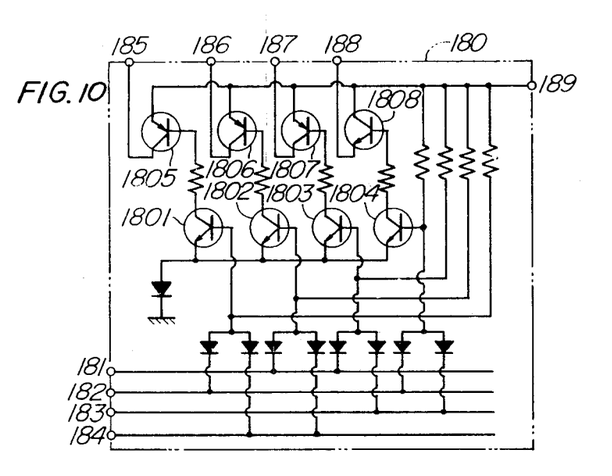
FIG. 10 is a circuit diagram of an example of an electromagnetic valve drive circuit of the system according to the invention.

FIG. 10 shows the circuit construction of the electromagnetic valve drive circuit 180 comprising an AND circuit having transistors 1801, 1802, 1803 and 1804 and a power supply circuit having transistors 1805, 1806, 1807 and 1808.

With signal "1" impressed on the input terminals 182 and 184 and signal "0" impressed on the input terminals 181 and 183, only the transistor 1801 of the AND circuit is triggered while the other transistors are off. With signal "1" impressed on the input terminals 181 and 184 and signal "0" impressed on the input terminals 182 and 183, only the transistor 1802 is triggered while the other transistors are off. With signal "1" impressed on the input terminals 181 and 183 and signal "0" impressed on input terminals 182 and 184, only the transistor 1803 is triggered while the other transistors are off. Finally, with signal "1" impressed on the input terminals 182 and 183 and signal "0" impressed on the input terminals 181 and 184, only the transistor 1804 is triggered while the other transistors are off. The triggering of the transistors 1801 to 1804 triggers the associated transistors 1805 to 1808 to supply driving power to the respective output terminals 185 to 188. The output terminal 185 supplies power to energize the first solenoid of the electromagnetic valve unit 40, the output terminal 186 supplies power to energize the second solenoid, the output terminal 187 supplies power to energize the third solenoid, and the output terminal 188 supplies power to energize the fourth solenoid.

It is to be understood that the memory 170 may be constructed such that the "0" signal, instead of the "1" signal as in the foregoing, at the output terminals 161', 162', 163' and 164' of the logical circuit 160 gives rise to the drive signal at the respective output terminals 185 to 188 of the electromagnetic valve drive circuit 180.

The selector switch 30 comprises five fixed contacts and a movable contact linked to a lever. By placing the lever in the "Automatic position, voltage appears at the output terminal 31 to render the electromagnetic valve drive circuit 180 operative. Thus, the state for the automatic transmission is set up. The manual shifting may be accomplished, independently of the automatic transmission control system, by placing the manual lever in the "First", "Second", "Third", or "Reverse" position to produce voltage at the output terminal 34, 33, 32 or 35 so as to energize the first, second, third or reverse solenoid of the electromagnetic valve unit 40, thus placing the transmission in the corresponding gear.

Figure 3B:
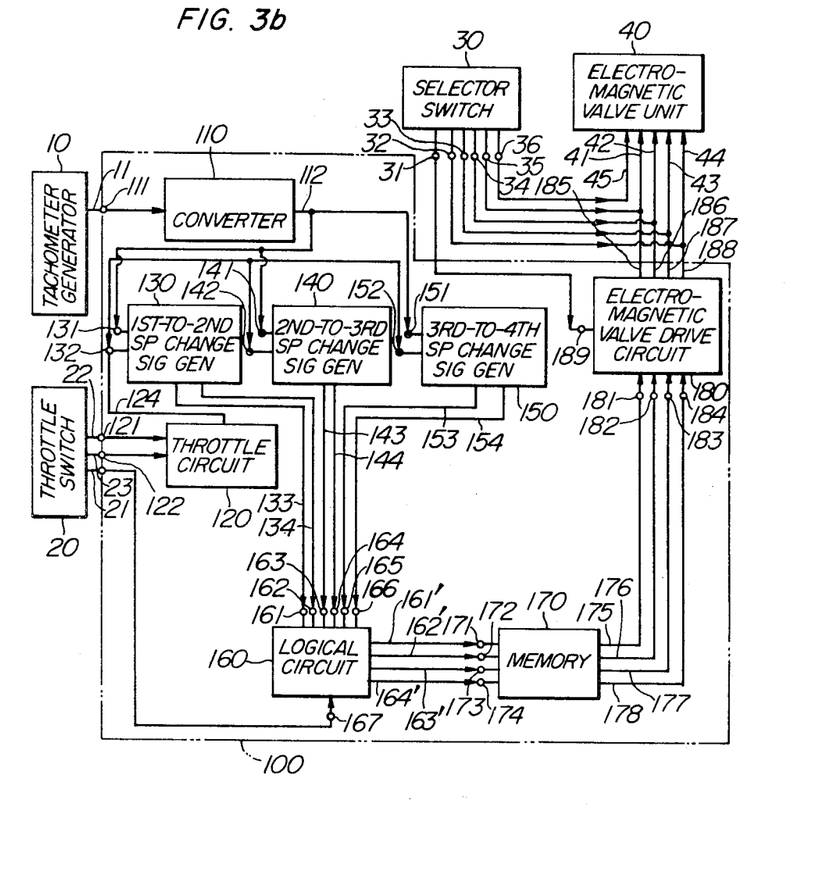
FIG. 3b is a block diagram showing circuit connections of a second embodiment of the automatic transmission control system according to the invention.

A second embodiment of the automatic transmission control system according to the invention is shown in FIG. 3b and will now be described. Similar or corresponding parts to those of the first embodiment are designated by identical reference numerals and symbols in the Figure and in the description.

The second embodiment differs from the first embodiment in that the output terminal 21 of the throttle switch 20 is connected to an input terminal 167 of the logical circuit 160, and that the selector switch 30 of the second embodiment of FIG. 3b has six fixed contacts to provide for four forward speeds and one reverse speed unlike the selector switch of the first embodiment of FIG. 3a having only five fixed contact to provide for three forward speeds and one reverse speed, with one of the six output terminals 31, 32, 33, 34, 35 and 36 of the selector switch 30, namely the terminal 31, connected to the input terminal 189 of the electromagnetic valve drive circuit 180, the output terminals 32, 33, 34 and 35 connected to the respective input terminals 41, 42, 43 and 44 of the electromagnetic valve unit 40 and the remaining output terminal 36 connected to the input terminal 45 of the electromagnetic valve unit 40. In this Figure, the power supply and power supply circuit are also omitted for the sake of brevity.

Figure 5B:
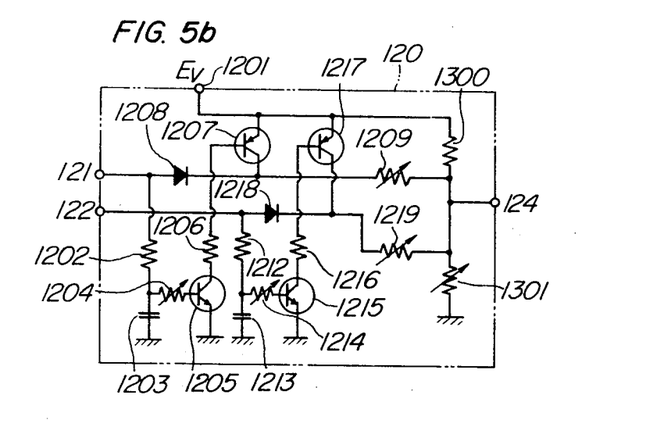
FIG. 5b is a circuit diagram of a second example of the throttle circuit of the system according to the invention.

The circuit construction of the throttle circuit 120 of the second embodiment is shown in FIG. 5b. It has a terminal 1201, on which is applied with a voltage $E_v$, a resistor 1202 inserted between its input terminal 121 and one end of a capacitor 1203, whose other end is grounded, a variable resistor 1204 inserted between the connection between the resistor 1202 and the capacitor 1203 and the base of a transistor 1205, whose emitter is grounded, a resistor 1206 inserted between the collector of the transistor 1205 and the base of the transistor 1207, whose emitter is connected to the terminal 1201 and whose collector is connected to the negative pole of a diode 1208 having the positive pole connected to the input terminal 121, a variable resistor 1209 inserted between the collector of the transistor 1207 and the output terminal 124, a resistor 1212 inserted between the input terminal 122 and one end of a capacitor 1213, whose other end is grounded, a variable resistor 1214 inserted between the connection between the resistor 1212 and the capacitor 1213 and the base of a transistor 1215, whose emitter is grounded, a resistor 1216 inserted between the collector of the transistor 1215 and the base of a transistor 1217, whose emitter is connected to the terminal 1201 and whose collector is connected to the negative pole of a diode 1218 having the positive pole connected to the input terminal 122, a variable resistor 1219 inserted between the collector of the transistor 1217 and the output terminal 124, a resistor 1300 inserted between the terminal 1201 and the output terminal 124 and a variable resistor 1302 inserted between the output terminal 124 and the ground.

In the operation of the throttle circuit of the above construction, when the signal (voltage $E_v$) is absent at the input terminals 121 and 122, the transistors 1205 and 1215 and hence the transistors 1207 and 1217 are all off, so that the output terminal 124 is at a voltage $E_1$ given as:

$$E_1 = R_1/(R+R_1) \cdot E_v, \qquad (1)$$

where $R$ is the resistance of the resistor 1300 and $R_1$ is the resistance of the variable resistor 1301. When the signal $E_v$ is applied on the input terminal 121 upon actuation of the throttle switch 20 into the "Normal" state as the accelerator pedal is pushed down on, current is caused through a path from the diode 1208 through the variable resistors 1209 and 1301 to the ground to render the output terminal 124 to be at a voltage $E_2$ given as:

$$E_2 = R_1/(R_1 + R \parallel R_2) \cdot E_v, \qquad (2)$$

where $R_2$ is the resistance of the variable resistor 1209. The voltage drop across the diode 1208 in the forward direction is ignored. Simultaneously with the current through the above-mentioned path, current is also caused through the resistor 1202 to charge the capacitor 1203, while causing current through the variable resistor 1204 and the base of the transistor 1205 to trigger the transistor 1205, thereby causing current along a path from the emitter of the transistor 1207 through the resistor 1206 to the collector of the transistor 1205 to trigger the transistor 1207. Then, when gradually releasing the accelerator pedal, the throttle switch 20 is actuated to cut the signal to the input terminal 121. Nevertheless, the voltage $E_2$ of the equation 2 persists at the output terminal 124, since the transistor 1205 and hence the transistor 1207 continue to carry current because of the discharge current from the capacitor 1205 through the variable resistor 1204 to the base of the transistor 1205 for a certain period $T_1$. When the constant period $T_1$ has been passed, the discharge current from the capacitor 1203 ceases to cut off the transistor 1205 and hence also cut off the transistor 1207, so that the voltage at the output terminal 124 assumes the value $E_1$ of equation 1. The above period $T_1$ depends upon the parameter values of the capacitor 1203 and the resistor 1204. When the accelerator pedal is continuously fully depressed, the throttle switch 20 reaches the "Full" state, whereupon the signal $E_v$ appears at both the input terminals 121 and 122 and the voltage at the output terminal 124 assumes a value $E_3$ expressed as:

$$E_3 = R_1/(R \parallel R_2 \parallel R_3 + R_1) \cdot E_v, \qquad (3)$$

where $R_3$ is the resistance of the variable resistor 1219. Simultaneously, the transistors 1205 and 1215 are triggered to trigger the transistors 1207 and 1217. Then, by releasing the accelerator pedal to switch the throttle switch 20 from the "Full" state to the "Normal" state, the signal ($E_v$) on the input terminal 122 disappears. However, the voltage $E_3$ of equation 3 persists at the output terminal 124, since the transistor 1215 and hence the transistor 1217 continue to carry current owing to the presence of the discharge current from the capacitor 1213 through the variable resistor 1214 to the base of the transistor 1215, until a constant period $T_2$ has been passed, whereupon the discharge current from the capacitor 1213 disappears to cut off the transistor 1215 and hence the transistor 1217, so that the voltage at the output terminal 124 assumes the value $E_2$ of equation 2. The above period $T_2$ is determined by the parameter values of the capacitor 1213 and the variable resistor 1214. By further releasing the accelerator to switch the throttle switch 20 to the "Light" or "Idle" state (with the movable contact 24 of the throttle switch 20 broken off all the fixed contacts 21', 22' and 23' thereof), the voltage at the output terminal 124 eventually becomes $E_1$ of equation 1 the period $T_1$ after the actuation of the throttle switch 20. To briefly state the foregoing operation, the "Light", "Normal" and "Full" states of the throttle switch 20 correspond to the respective voltages $E_1$, $E_2$ and $E_3$ at the output terminal 124, and when the throttle switch 20 is switched from the "Full" state to another state or from the "Normal" state to the "Light" or "Idle" state, the voltage $E_3$ corresponding to the "Full" state or $E_2$ corresponding to the "Normal" state, which is present at the output terminal 124, is maintained for the period $T_2$ for $E_2$ and $T_1$ for $E_1$.

As the output terminal 21 of the throttle switch 20 of this embodiment is connected to the input terminal 167 of the logical circuit 160, signal (voltage $E$) is applied to the input terminal 167 if the movable contact 24 of the throttle switch 20 is in contact with the fixed contact 21'. If, however, the movable contact 24 gets out of contact with the fixed contact 21' as a result of releasing the accelerator pedal, the signal to the input terminal 167 disappears, because there is no signal at the output terminals 161', 162', 163' and 164' of the logical circuit 160.

The memory 170 provides the "1" signal at the output terminals 175 to 178 if the corresponding output terminals 161', 162', 163' and 164' of the logical circuit 160 are selectively at "1", and it holds the signal immediately before the disappearance thereof from the logical circuit 160.

The selector switch 30 of this embodiment comprises six fixed contacts and a movable contact linked to a lever. By placing the lever in the "Automatic" position, voltage appears at the output terminal 31 to render the electromagnetic valve drive circuit 180 operative.

Thus, the state for the automatic transmission control is set up. The shifting manual may be accomplished, independently of the automatic transmission control system, by placing the manual lever in the "Manual 1-st.", "Manual 2-nd.", "Manual 3-rd.", "Manual 4-th." or "Manual R" position to produce a signal at the output terminal 35, 34, 33, 32 or 36 so as to open the first, second, third, fourth or reverse electromagnetic valve of the electromagnetic valve unit 40, thus bringing the respective gears into mesh with the engine side gear.

As the various component circuits of the second embodiment operate as in the foregoing, by releasing the accelerator pedal after the "Full" or "Normal" state of the throttle switch 20 is reached to render the transmission into the third or second as the accelerator pedal is depressed for slight acceleration when driving down a decline or on a horizontal road, the throttle circuit 120 returns to the "Idle" state within the delay time of either $T_1$ or $T_2$, thereby cutting the output signal from the logical circuit 160 to maintain the state of the memory 170 previous to releasing the accelerator pedal so as to hold the transmission in the third or second attained by the previous pedaling of the accelerator pedal, thus preventing upshifting into the next gear, which otherwise takes place when releasing the accelerator pedal, so that the automobile may be driven by bringing about the engine brake with the transmission maintained in the position attained by the previous movement of the accelerator pedal. As a result of experiments, it is confirmed that if the above delay time is about 0.7 to 1.5 seconds, no trouble is caused during normal driving.

We claim:

1. An automatic transmission control system for automobiles, which comprises:
   a plurality of speed change signal generator circuits for developing various combinations of speed change signals representing different transmission ratios,
   a logical circuit connected to said speed change signal generator circuits for developing specific transmission ratio signals from said combinations,
   a memory connected to said logical circuit for remembering said transmission ratio signals from at least one to the next, and
   an electromagnetic valve drive circuit including an AND circuit connected to said logical circuit for deriving valve drive signals in accordance with said transmission ratio signals.

2. An automatic transmission control system for automatic transmissions having electromagnetic valves with solenoids and useable in vehicles having wheels and an accelerator pedal, which comprises:
   a tachometer generator for generating an output at frequencies proportional to the r.p.m. of the vehicle wheels,
   an a.c.-to-d.c. converter to convert the output from said wheel r.p.m. detector into a corresponding d.c. voltage,
   a throttle switch co-operating with the accelerator pedal and having a multi-contact construction,
   a throttle circuit connected to said throttle switch and having an output terminal to provide output of various valves corresponding to respective states of said throttle switch,
   a plurality of gear signal generators having predetermined shifting characteristics and comparing the output signal from said a.c.-to-d.c. converter and the output signal from said throttle circuit for developing change signals,
   a logical circuit connected to said gear signal generators for logically operating on said gear change signals to change them to a different form,
   a memory connected to said logical circuit for remembering the changed gear change signals from at least one to the next, and
   an electromagnetic valve drive circuit including and AND circuit connected to said memory to feed said solenoids of said electromagnetic valves.

3. The automatic transmission control system for automobiles according to claim 2, wherein said transmission has both automatic and manual gear shifts, said system including a selector switch connected to said electromagnetic valve drive circuit and to said solenoids of said electromagnetic valves to select between the automatic and manual gear shifts of the transmission.

4. The automatic transmission control system for vehicles according to claim 2, wherein said throttle switch includes a movable contact and a plurality of fixed contacts.

5. The automatic transmission control for vehicles according to claim 2, wherein said throttle circuit includes a resistor connected between the power supply and an output terminal, two variable resistors respectively connected between respective input terminals at one end said output terminal at the other end, and a variable resistor connected between said output terminal and the ground.

6. The automatic transmission control system for vehicles according to claim 2, wherein said memory includes two bistable multi-vibrators having respective capacitors to determine the initial state of said two bistable multi-vibrators, and two transistors to maintain the state of said two bistable multi-vibrators previous to an impression thereon of an external signal from said logical circuit to change signals at the input terminals of said two bistable multi-vibrators.

7. The automatic transmission control system for vehicles according to claim 6, wherein one of said two transistors (the first transistor) has the base connected to the collector of the other transistor (the second transistor), the collector of said first transistor being connected to the said input terminals of said memory through the respective diodes, the emitter of said first transistor being grounded, the collector of said second transistor being connected through a resistor to a power supply, the base of said second transistor being connected through a resistor to a control input terminal of said memory, and the emitter of said second transistor being grounded.

8. The automatic transmission control system for vehicles according to claim 6, wherein said input terminals of said memory connected through said respective diodes to said first transistors are four in number (the first to fourth terminals), said bistable multi-vibrators have respective two transistors (the first to fourth multi-vibrator transistors), the first multi-vibrator transistor is connected to a pair of diodes having respective positive poles respectively in connection to the first and fourth terminals, the second multi-vibrator transistor is connected to a pair of diodes having respective positive poles respectively connected to the second and third terminals, the third multi-vibrator transistor is connected to a pair of diodes having respective positive poles respectively in connection to the first and second terminals, the fourth multi-vibrator transistor is connected to a pair of diodes having respective positive poles respectively connected to the third and fourth terminals, and the collectors of the first to fourth multi-vibrator transistors are connected to respective output terminals of said memory.

9. The automatic transmission control system for vehicles according to claim 2, wherein said electromagnetic valve drive circuit includes four input terminals to receive respective output signals from said memory circuit, four output terminals to supply power to respective solenoids of the electromagnetic valves, four transistors in said AND circuit and four transistors in said power supply circuit to feed said solenoids of the electromagnetic valves, the transistors in said AND circuit being connected through respective resistors to the respective transistors in said power supply circuit, and the bases of the transistors in said AND circuit being connected through respective pairs of diodes to respectively different pairs of two input terminals selected from said input terminals.

10. The automatic transmission control system for vehicles according to claim 2, wherein said electromagnetic valve drive circuit includes four input terminals to receive respective output signals from said memory circuit, four output terminals to supply power to respective solenoids of the electromagnetic valves, four transistors in said AND circuit and four transistors in said power supply circuit to feed said solenoids of the electromagnetic valves, the transistors in said AND circuit being connected through respective resistors to the respective transistors in said power supply circuit, and the bases of the transistors in said AND circuit being connected to the positive pole of respective pairs of diodes having respective negative poles respectively connected to said input terminals such that said pairs of the diodes correspond to respectively different combinations in pair of said input terminals.

11. An automatic transmission control system of the type having a signal holding circuit and for use with vehicles having respective accelerator pedals, which comprises:
a throttle switch for operative connection with a said accelerator pedal and having a multi-contact constructions, and
a throttle circuit connected to said throttle switch and including a circuit to produce output of different values at an output terminal thereof upon actuation of said multi-contact throttle switch and timer circuits associated to respective fixed contacts of said multi-contact throttle switch for maintaining for a constant period of time the signal present at said output terminal immediately before releasing the accelerator pedal, whereby the output signal from said throttle switch produced upon releasing the accelerator pedal cuts the signal impressed on input terminals of said signal holding circuit to maintain the signal immediately before the cut-off signal.

12. The automatic transmission control system for vehicles according to claim 11, wherein said throttle circuit includes; a resistive voltage divider having a series connection of a first fixed resistor and a first variable resistor, the other end of said first fixed resistor being connected to a first input terminal which is applied with a first signal of a constant predetermined voltage, the connection between both said resistors (voltage dividing point) being connected to said output terminal of said throttle circuit, and the other end of said first variable resistor being grounded; a second signal voltage receiving circuit having a series connection of a first diode and a second variable resistor connected to each other through a first lead, the other end of said first diode being connected to a second input terminal which is applied with a second signal of said predetermined voltage, and the other end of said second variable resistor being connected to said voltage dividing point; a third signal voltage receiving circuit having a series connection of a second diode and a third variable resistor connected to each other through a second lead, the other end of said second diode being connected to a third input terminal which is applied with a third signal of said predetermined voltage, and the other end of said third variable resistor being connected to said voltage dividing point; a first timer circuit having a series circuit of a second fixed resistor connected to said second input terminal and a first grounded capacitor, a first transistor having the emitter connected to the ground and the base connected through a fourth variable resistor to the connection between said second fixed resistor and said first capacitor, and a second transistor having the emitter connected to said first input terminal, the base connected through a third fixed resistor to the collector of said first transistor and the collector connected to said first lead; and a second timer circuit having a series circuit of a fourth fixed resistor connected to said third input terminal and a second grounded capacitor, a third transistor having the emitter connected to the ground and the base connected through a fifth variable resistor to the connection between said fourth fixed resistor and said second capacitor, and a fourth transistor having the emitter connected to said first input terminal, the base connected through a fifth fixed resistor to the collector of said third transistor and the collector connected to said second lead.

13. A control system for an automatic transmission having a plurality of gear shifting mechanisms and being usable in a vehicle having a movable accelerator, comprising:
vehicle speed detector means for producing a digital signal having pulses whose number per unit time is proportional to the speed of said vehicle,
converter means operatively connected to said speed detector means for converting said digital signal to an analog signal having a magnitude proportional to the number of pulses per unit time of said digital signal,
a throttle switch for cooperating with said accelerator and having a plurality of signal outputs differing in accordance with the amount of movement of said accelerator and having no output when said accelerator is released, throttle circuit means connected to said throttle switch for producing a voltage signal whose value varies depending on the output of said throttle switch, a plurality of gear-shift signal generator circuit means, each connected to said converter means and said throttle circuit means, for producing different speed change signals in accordance with respective predetermined transmission characteristics depending on the magnitude of said analog signal of said converter means relative to the value of said voltage signal of said throttle circuit means, logic circuit means connected to said plurality of gear-shift signal generator means for producing one of different gear-shift signals which is logically determined from said different speed change signals;

memory means connected to said logic circuit means and said throttle switch for memorizing an output which changes in accordance with the change of the gear-shift signal derived from said logic circuit means when said at least one of said throttle switch output is effected by said accelerator movement, and which is retained irrespective of a change in said gear-shift signal during the time no throttle switch output is effected because said accelerator is released, and means including an electromagnetic valve unit for controlling the operation of said gear shifting mechanism in accordance with the output memorized in said memory.

14. A control system according to claim 13 wherein said memory means comprises an input circuit connected to said logic circuit means for receiving said different gear-shift signals, bistable multivibrator means connected to said input circuit for producing said output corresponding to said gear-shift signals, and a circuit connected to said input circuit for bypassing said different gear-shift signals during the presence of said no output derived from said throttle switch thereby preventing said signals from being applied to said bistable multivibrator means.

15. An automatic transmission control system for use in an automatic transmission on vehicles having an engine, an engine throttle, and a plurality of gear ratio drives which comprises:

first means for generating an a-c voltage at a frequency proportional to the speed of the vehicle, a first circuit connected to said means for generating a variable d-c voltage proportional to said frequency, a second circuit connected to the engine throttle for generating a variable d-c voltage corresponding to the opening of said throttle, a third circuit having two inputs each connected to said first circuit and said second circuit and generating a signal when the aforesaid two variable d-c voltages attain a predetermined relationship, a fourth circuit connected to said third circuit for generating an output signal corresponding to a signal generated by said third circuit and holding said output signal until another signal which is different from the signal formerly generated by said third circuit appears, said fourth circuit including a fifth circuit having a terminal for holding the output signal of said fourth circuit constant regardless of the input signal from said third circuit when a signal is applied to said terminal, said terminal being connected to said second circuit thereby to hold the output signal from said fourth signal when the d-c voltage of said second circuit does not reach a predetermined value, and third means having an input connected to said fourth circuit and including a gear shifting mechanism for accomplishing a selective gear ratio drive in response to the signal of said fourth circuit.

16. A control system for an automatic transmission having a plurality of gear shifting mechanisms and being usable in a vehicle having an engine, comprising:

vehicle speed detector means for producing an output signal proportional to the speed of said vehicle, means for producing a signal corresponding to the load on said engine, gear-shift signal generator circuit means connected to said detector means and to said load signal producing means for producing different speed change signals in accordance with predetermined transmission characteristics depending on the values of said output signal and load signal, memory means connected to said gear-shift signal generator means for memorizing an output which changes in accordance with said speed change signals, and means connected to said memory means for controlling the operation of said gear shifting mechanisms in accordance with the said memorized output of said memory means.

17. A control system for an automatic transmission having a plurality of gear shifting mechanisms and being usable in a vehicle having an engine comprising:

vehicle speed detector means for producing an output signal proportional to the speed of said vehicle, means producing a signal corresponding to the load on said engine, gear-shift signal generator circuit means connected to said load signal producing means and to said detector means for producing different speed change signals in accordance with predetermined transmission characteristics depending on the relative values of said output signal and said load signal, memory means connected to said gear-shift signal generator means and said load signal producing means for memorizing an output which changes in accordance with said speed change signals while said load signal producing means produces a load indicating signal, but which output is maintained when a no load signal occurs from load signal producing means even if there is a change in said speed change signals, and means connected to said memory means for controlling the operation of said gear shifting mechanisms in accordance with the said memorized output of said memory means.

18. An automatic transmission control system for a vehicle having wheels connected through an automatic transmission having gears to an engine with an accelerator pedal and an electromagnetic valve unit with a plurality of electromagnetic valves having respective solenoids, comprising:

a wheel r.p.m. detector for generating an output at frequencies proportional to the vehicle wheel speed;

an ac to dc voltage converter connected to said detector for converting the output thereof into a corresponding dc voltage, a throttle switch adapted to cooperate with the accelerator pedal and having a plurality of contacts successively made upon further depression of the accelerator pedal, a throttle circuit connected to said throttle switch and having an output terminal to provide outputs of various values corresponding to respective contacts of the throttle switch, a plurality of gear shift signal generators connected to said converter and throttle circuit and having predetermined shifting characteristics and comparing the output signal from said ac to dc converter with the output signal from said throttle circuit to produce differing combinations of gear shifting signals representing different desired transmission gearing ratios, a logic circuit connected to said gear shift signal generators for producing different output signals according to said differing combinations of gear shifting signals from said gear shift signal generators, a memory circuit connected to said logic circuit for holding the logic circuit output signals that immediately exist before the dissappearance thereof from said logic circuit, and an electromagnetic valve drive circuit connected to and controlled by said memory circuit to feed said solenoids of said electromagnetic valves to change a gearing ratio.

19. An automatic transmission control system for vehicles having engines and using automatic transmission having gear-shifting mechanisms, comprising:

vehicle speed detector means for operative connection to said vehicle to produce an output signal at frequencies proportional to the vehicle speed, AC-DC converter means connected to said detector means to convert the output signal of said vehicle speed detector into a corresponding analog signal, engine load detector means for operative connection to the engine of said vehicle to produce an output signal corresponding to the engine throttle valve opening or engine intake negative pressure, gear-shift signal generator circuit means connected to said AC-DC converter and load detector means to generate a gear-shift signal by detecting certain relationships between the output signals of said AC-DC converter means and said engine load detector means, memory means connected to and producing an output signal in accordance with the output signal of said gear-shift signal generator circuit means, means connected between said load detector and memory means for causing the output signal of said memory means to be locked upon appearance from said engine load detector means of a signal indicating the "cut-off" of the state of the engine throttle valve, and means connected to said memory means for operative connection to the automatic transmission of said vehicle to execute the shifting of the transmission gear-shifting mechanism thereof in accordance with the output signal of said memory means.

20. An automatic transmission control system for vehicles having engines with throttle valves and using automatic transmissions having gear-shifting mechanisms comprising:

means including a vehicle speed detector for operative connection to a said vehicle for producing an output signal proportional to the vehicle speed, engine load detector means for operative connection to the engine of said vehicle to produce an output signal corresponding to the engine load, gear-shift signal generator means connected to said vehicle speed detector means and load detector means for generating output signals upon detecting certain gear-shift relationships between the aforesaid output signals thereof, memory means connected to said gear-shift signal generator means for producing an output signal in accordance with the output signal thereof, means connected between said load detector and memory means for causing the output signal of said memory means to be locked upon appearance from said engine load detector means of a signal indicating the "cut-off" state of the engine throttle valve, and means connected to said memory means for operative connection to the automatic transmission of said vehicle to execute the shifting of the transmission gear-shifting mechanism thereof in accordance with the output signal of said memory means.

21. An automatic transmission control system for vehicle having engines and using automatic transmissions having gear-shifting mechanisms, comprising:

vehicle speed detector means for operative connection to said vehicle for producing an output signal proportional to the vehicle speed, gear-shift signal generator circuit means connected to said detector means for producing different speed change signals in accordance with predetermined characteristics depending on the values of at least said output signal from said detector means, memory means connected to and producing an output signal in accordance with the output signal of said gear-shift signal generator circuit means, and mean connected to said memory means for operative connected to the automatic transmission of said vehicle to execute the shifting of the transmission gear-shifting mechanism thereof in accordance with the output signal of said memory means.

22. A control system as in claim 21, including means connected to said memory means for causing the output signal of said memory means to be locked upon the occurrence of certain conditions.

* * * * *